(12) United States Patent
Tegethoff et al.

(10) Patent No.: US 10,334,326 B2
(45) Date of Patent: Jun. 25, 2019

(54) ENHANCED PLAYBACK BAR

(71) Applicant: Roku, Inc., Los Gatos, CA (US)

(72) Inventors: Christopher James Tegethoff, Portland, OR (US); Abhijit Pol, Los Gatos, CA (US)

(73) Assignee: ROKU, INC., Los Gatos, CA (US)

( * ) Notice: Subject to any disclaimer, the term of this patent is extended or adjusted under 35 U.S.C. 154(b) by 0 days.

(21) Appl. No.: 15/806,379

(22) Filed: Nov. 8, 2017

(65) Prior Publication Data

US 2019/0141415 A1     May 9, 2019

(51) Int. Cl.
*H04N 21/845*     (2011.01)
*G11B 27/00*     (2006.01)
(Continued)

(52) U.S. Cl.
CPC ....... *H04N 21/8455* (2013.01); *G11B 27/005* (2013.01); *G11B 27/34* (2013.01); *H04N 21/252* (2013.01); *H04N 21/44222* (2013.01); *H04N 21/4667* (2013.01); *H04N 21/47217* (2013.01)

(58) Field of Classification Search
None
See application file for complete search history.

(56) References Cited

U.S. PATENT DOCUMENTS 9,002,175 B1   4/2015   Raj
2004/0247286 A1*   12/2004   Takagi ................. G11B 27/005
                                                386/344
(Continued)

OTHER PUBLICATIONS

U.S. Appl. No. 15/806,384, filed Nov. 8, 2017, entitled "Automatically and Programmatically Generating Scene Change Markers."
(Continued)

*Primary Examiner* — Heather R Jones
(74) *Attorney, Agent, or Firm* — Sterne, Kessler, Goldstein & Fox P.L.L.C.

(57) ABSTRACT

Enhancements to the video playback bar, involving snapping to time markers, are described herein. The playback bar is part of a graphical user interface (GUI) for a TV or other display device, and includes a current playback time (CTI) and a plurality of scene change markers. The playback bar is sticky. The stickiness of the playback bar is based on (1) a speed of the CTI in the playback bar, while a movie or TV show (or other content) is being played in the display device, and (2) a distance of the CTI to a closest scene change marker in the playback bar, at a time a pause or stop command is received. The method operates by receiving a first command to play, fast forward, rewind, seek, or scrub through the content being played on the display device. The first command is executed, and then a second command to pause or stop is received. The second command is executed. A scene change marker in the playback bar closest to the CTI after execution of the second command is identified. Then, it is determined whether the distance from the CTI to the closest scene change marker is within a time threshold. If the distance is within the time threshold, then the CTI is snapped to the closest scene change marker. In some embodiments, the time thresholds associated with speeds of the CTI may be adjusted in a crowdsourced manner.

17 Claims, 10 Drawing Sheets

(51) Int. Cl.
*G11B 27/34* (2006.01)
*H04N 21/25* (2011.01)
*H04N 21/442* (2011.01)
*H04N 21/466* (2011.01)
*H04N 21/472* (2011.01)

(56) References Cited

U.S. PATENT DOCUMENTS

| | | |
|---|---|---|
| 2010/0229121 A1 | 9/2010 | Falchuk |
| 2014/0006951 A1 | 1/2014 | Hunter |
| 2014/0282262 A1* | 9/2014 | Gregotski .......... H04N 21/2387 715/838 |
| 2015/0074552 A1 | 3/2015 | Chai et al. |
| 2015/0249869 A1 | 9/2015 | Dhruv et al. |
| 2016/0014458 A1* | 1/2016 | Robinson ............. G11B 27/005 386/241 |
| 2017/0060858 A1 | 3/2017 | Sharp |
| 2017/0201793 A1 | 7/2017 | Pereira et al. |
| 2017/0289619 A1 | 10/2017 | Xu et al. |

OTHER PUBLICATIONS

U.S. Appl. No. 15/940,386, filed Mar. 29, 2018, entitled "Automatically and Programmatically Generating Crowdsourced Trailers".

International Search Report and Written Opinion of the International Searching Authority for International Application No. PCT/US2018/059521, dated Feb. 22, 2019 (12 pages).

* cited by examiner

ENHANCED PLAYBACK BAR

CROSS-REFERENCE TO RELATED APPLICATIONS

This application is related to U.S. patent application Ser. No. 15/806,384 titled "Automatically And Programmatically Generating Scene Change Markers," which is herein incorporated by reference in its entirety.

BACKGROUND

Field

This disclosure is generally directed to using learning systems to enhance the user's experience when playing content, such as movies and TV shows.

Background

Roku leads the over-the-top (OTT) market with more viewers streaming movies and TV shows on Roku devices than any other streaming device, including Google Chromecast, Amazon Fire, and Apple TV. Movies dominate the type of video-on-demand (VOD) content viewed across all regions and generations. A 2016 Nielsen report found that "Eighty percent of global respondents who watch on-demand content say they view movies." Roku streams over a billion hours of video per month, a 61 percent increase over 2016. (Bloomberg Technology, May 2017).

Data suggests that the OTT market will continue this positive trend for years to come, but when it comes to media consumption, the industry is in a continual cycle of rapid evolution. Technology that does not continually adapt to the changing needs of consumers may lose a competitive edge. With the transformation from older more traditional forms of consumption, such as the DVD and Blu-Ray to streaming content, one often overlooked feature is the scene change marker.

Streaming video has yet to adopt the idea of the DVD/Blu-ray scene change marker because the user can continue watching wherever they left off and scrub through a timeline of thumbnails. From a technology and implementation perspective, there are barriers in automatically and programmatically generating scene change markers. Scene transitions or chapter breaks to this day are still input manually, so it would be impossible to apply a manual approach to all the movies in an OTT provider's catalog. More importantly, simple automation would not be able to capture the interest level of millions of viewers.

SUMMARY

Provided herein are system, apparatus, article of manufacture, method and/or computer program product embodiments, and/or combinations and sub-combinations thereof, for using learning systems to improve the playback of content, such as movies and TV shows.

In some embodiments, a method is directed to automatically and programmatically generating scene change markers. The method operates in a media device that is communicatively coupled to, for example, a display device. The method can operate in other devices, such as but not limited to a smart TV. The display device includes a graphical user interface (GUI) having a playback bar. The playback bar includes a current playback time (CTI) and a plurality of markers.

The method operates by detecting user interactions as a user navigates through a movie or TV show (or other content) being presented on the display device. Point values are assigned to the user interactions. The detected user interactions and assigned point values represent training data. The training data is provided to a crowdsource server. The crowdsource server is configured to determine correlations and patterns in the training data to automatically and programmatically define crowdsourced markers for the movie/TV show using, for example, machine learning and artificial intelligence (AI) algorithms.

Other embodiments are directed to enhancements to the video playback bar, involving snapping to time markers. The playback bar is part of a graphical user interface (GUI) for a TV or other display device, and includes a current playback time (CTI) and a plurality of scene change markers. The playback bar is sticky. The stickiness of the playback bar is based on (1) a speed of the CTI in the playback bar, while a movie or TV show (or other content) is being played in the display device, and (2) a distance of the CTI to a closest scene change marker in the playback bar, at a time a pause or stop command is received.

The method operates by receiving a first command to play, pause, fast forward, or rewind while interacting with the content being played on the display device. The first command is executed, and then a second command to pause or stop is received. The second command is executed. A scene change marker in the playback bar closest to the CTI after execution of the second command is identified. Then, it is determined whether the distance from the CTI to the closest scene change marker is within a time threshold. If the distance is within the time threshold, then the CTI is snapped to the closest scene change marker. In some embodiments, the time thresholds associated with speeds of the CTI may be adjusted in a crowdsourced manner. It is noted that the above example involves a sequence of two user actions (i.e., the first command followed by the second command). More generally, the method monitors and analyzes user actions (i.e., presses of buttons on a remote control), and such actions can be a single action or a sequence of multiple actions.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

This disclosure is directed to using learning systems to improve the playback of content, such as but not limited to movies and TV shows. Some embodiments are directed to automatically and programmatically generating scene change markers. Other embodiments are directed to enhancements to the video playback bar, involving snapping to time markers. These embodiments are described below.

Introduction

Figure 1:
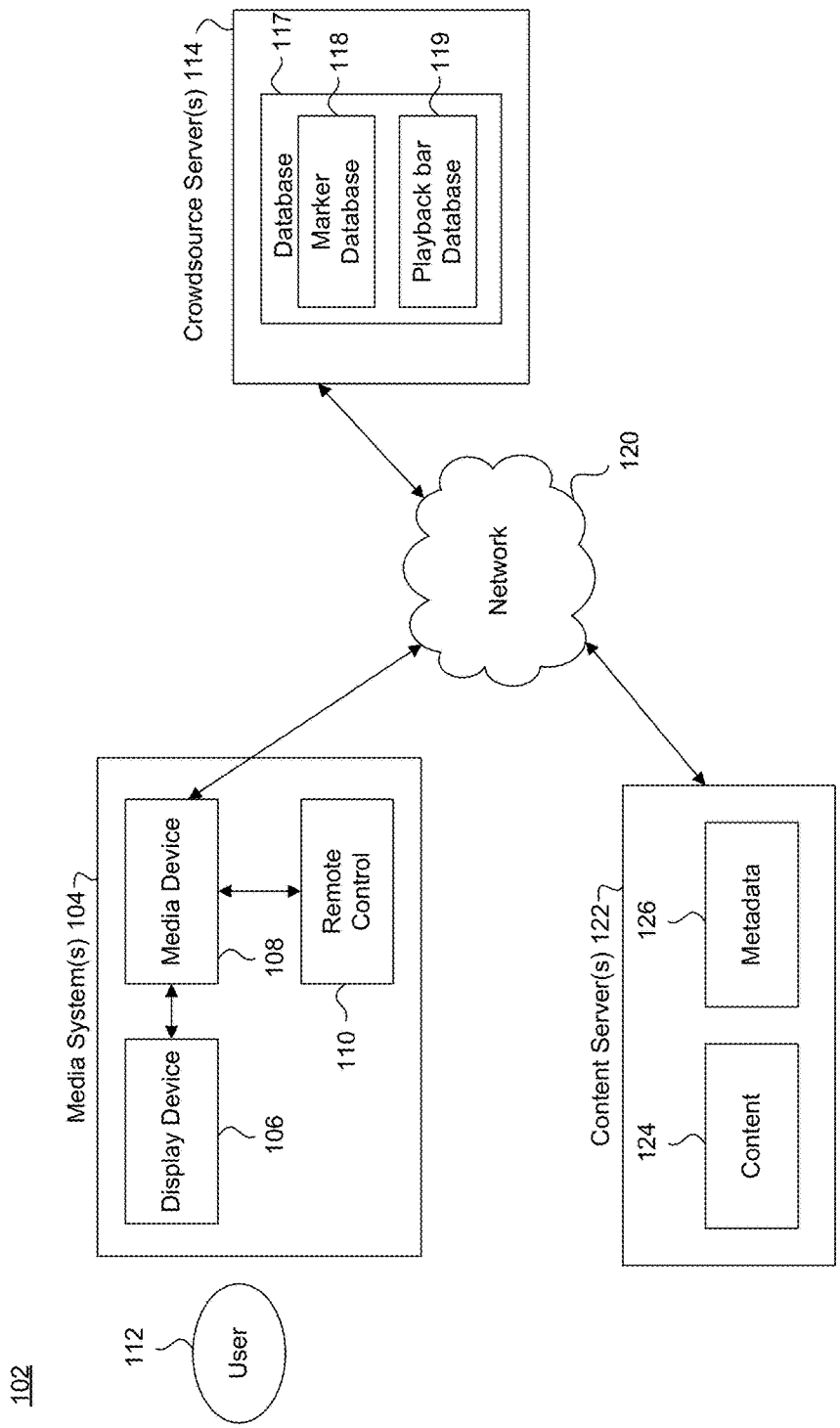
FIG. 1 illustrates a block diagram of a multimedia environment, according to some embodiments.

FIG. 1 illustrates a block diagram of a multimedia environment 102, according to some embodiments. In a non-limiting example, multimedia environment 102 is directed to streaming media. In some embodiments, the terms "media" and "content" are used interchangeably herein.

The multimedia environment 102 may include one or more media systems 104 and one or more content servers 122 communicatively coupled via a network 120. In various embodiments, the network 120 can include, without limitation, wired and/or wireless intranet, extranet, Internet, cellular, Bluetooth, broadcast, satellite, terrestrial, and/or any other short range, long range, local, regional, global communications network, as well as any combination thereof.

Media system 104 may include a display device 106, media device 108 and remote control 110. Display device 106 may be a monitor, television, computer, smart phone, tablet, wearable (such as a watch), and/or projector, to name just a few examples. Media device 108 may be a streaming media device, DVD device, Blu-Ray device, audio/video playback device, cable box, and/or digital video recording device, to name just a few examples. In some embodiments, the media device 108 can be a part of, integrated with, operatively coupled to, and/or connected to display device 106. The media device 108 may be configured to communicate with network 120.

A user 112 may interact with media system 104 via remote control 110. Remote control 110 can be any component, part, apparatus or method for controlling media device 108 and/or display device 106, such as a remote control, a tablet, laptop computer, smartphone, wearable device, on-screen controls, voice responsive controls, integrated control buttons, or any combination thereof, to name just a few examples. An example remote control 110 is illustrated in FIG. 2B.

Content servers 122 (also called content sources) may each include databases to store content 124 and metadata 126. Content 124 may include any combination of music, videos, movies, TV shows, multimedia, images, still pictures, text, graphics, gaming applications, advertisements, software, and/or any other content or data objects in electronic form. In some embodiments, metadata 126 comprises data about content 124. For example, metadata 126 may include associated or ancillary information indicating or related to writer, director, producer, composer, artist, actor, summary, chapters, production, history, year, trailers, alternate versions, related content, applications, and/or any other information pertaining or relating to the content 124. Metadata 126 may also or alternatively include links to any such information pertaining or relating to the content 124. Metadata 126 may also or alternatively include one or more indexes of content 124, such as but not limited to a trick mode index.

The multimedia environment 102 may also include one or more crowdsource servers 114. In some embodiments, crowdsource servers 114 each include one or more databases 117. Databases may include a marker database 118 and/or a playback bar database 119. The crowdsource servers 114 may be configured to communicate with network 120.

Figure 2A:
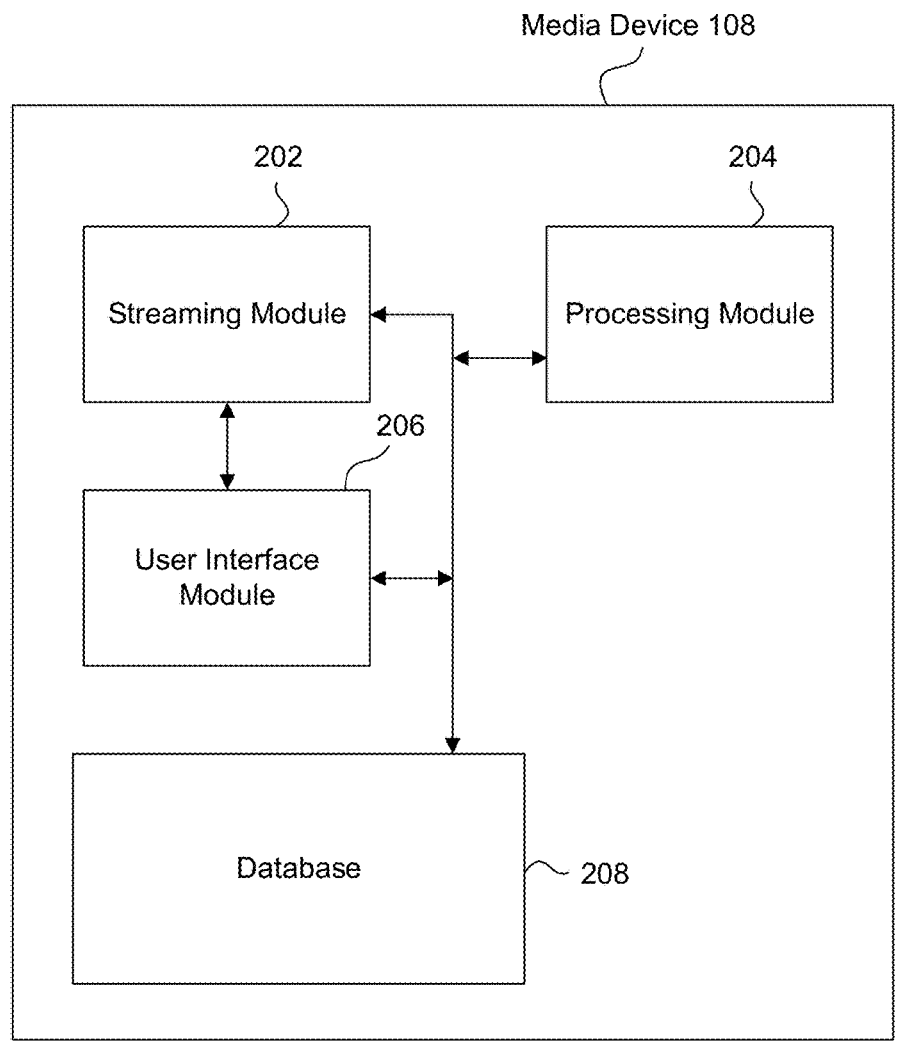
FIG. 2A illustrates a block diagram of a media device, according to some embodiments.
Figure 2B:
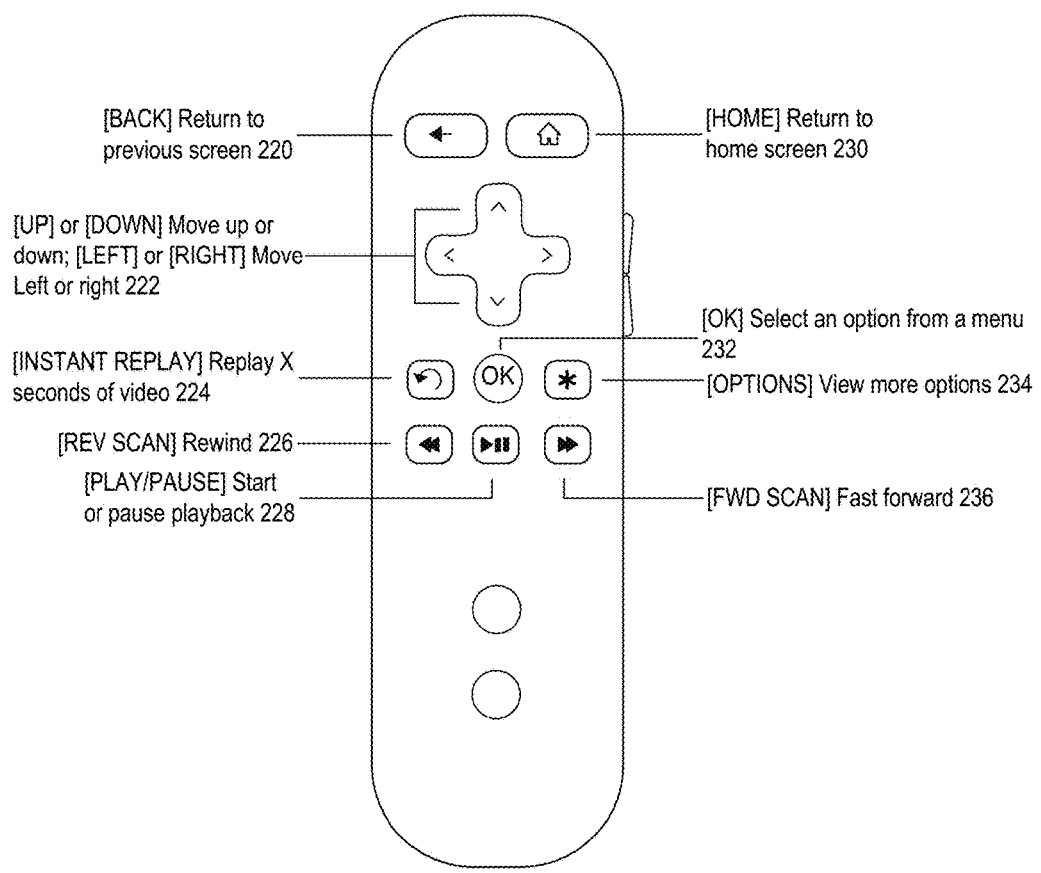
FIG. 2B illustrates a remote control for use with a media device, according to some embodiments.

FIG. 2A illustrates an example block diagram of the media device 108, according to some embodiments. Media device 108 may include a streaming module 202, processing module 204, user interface module 206 and database or storage 208.

Generally, in operation, user 112 may use remote control 110 (or, for example, voice responsive controls) to interact with the user interface module 206 of media device 108 to select content, such as a movie, TV show, music, book, application, game, etc. The streaming module 202 of media device 108 may request the selected content from content server(s) 122 over the network 120. Content server(s) 122 may transmit the requested content to the media device 108. Media device 108 may transmit the received content to display device 106 for presentation to user 112. The streaming module 202 in media device 108 may transmit the content to display device 106 in real time or near real time as it receives such content from content server(s) 122. Also or alternatively, media device 108 may buffer or store the content received from content server(s) 122 in database 208 for later playback on display device 106.

While watching a movie or TV show (or other content) on the display device 106, the user 112 may use the remote control 110 to navigate through the movie/TV show. For example, in some embodiments, the user 112 may press the [Left] or [Right] buttons 222, the rewind button 226 and/or the fast forward button 236 to display the example graphic user interface (GUI) 302 shown in FIG. 3. It should be understood that there may be other buttons (or combination of buttons) on the remote control 110 that may result in displaying the GUI 302 on the display device 106.

GUI 302 may represent a 10-foot UI when the display device 106 is a television, for example. Consider the case where the user 112 is watching a movie on the display device 106. In this case, the GUI 302 may display a video still 301 of the last frame of the movie that was being played when the user 112 invoked the GUI 302.

The GUI 302 may support thumbnail navigation for enabling the user 112 to quickly and efficiently navigate through the movie. For example, the GUI 302 may include thumbnails such as a frame in focus 305 representing a current scene change or chapter. Other thumbnails may include one or more previous scene change or chapter still frames 304, and one or more next scene change or chapter still frames 307. The user 112 can use remote control 110 to scroll through or otherwise select any of these thumbnails (that is, frames 304, 305 and 307) to quickly navigate through the movie.

Figure 3:
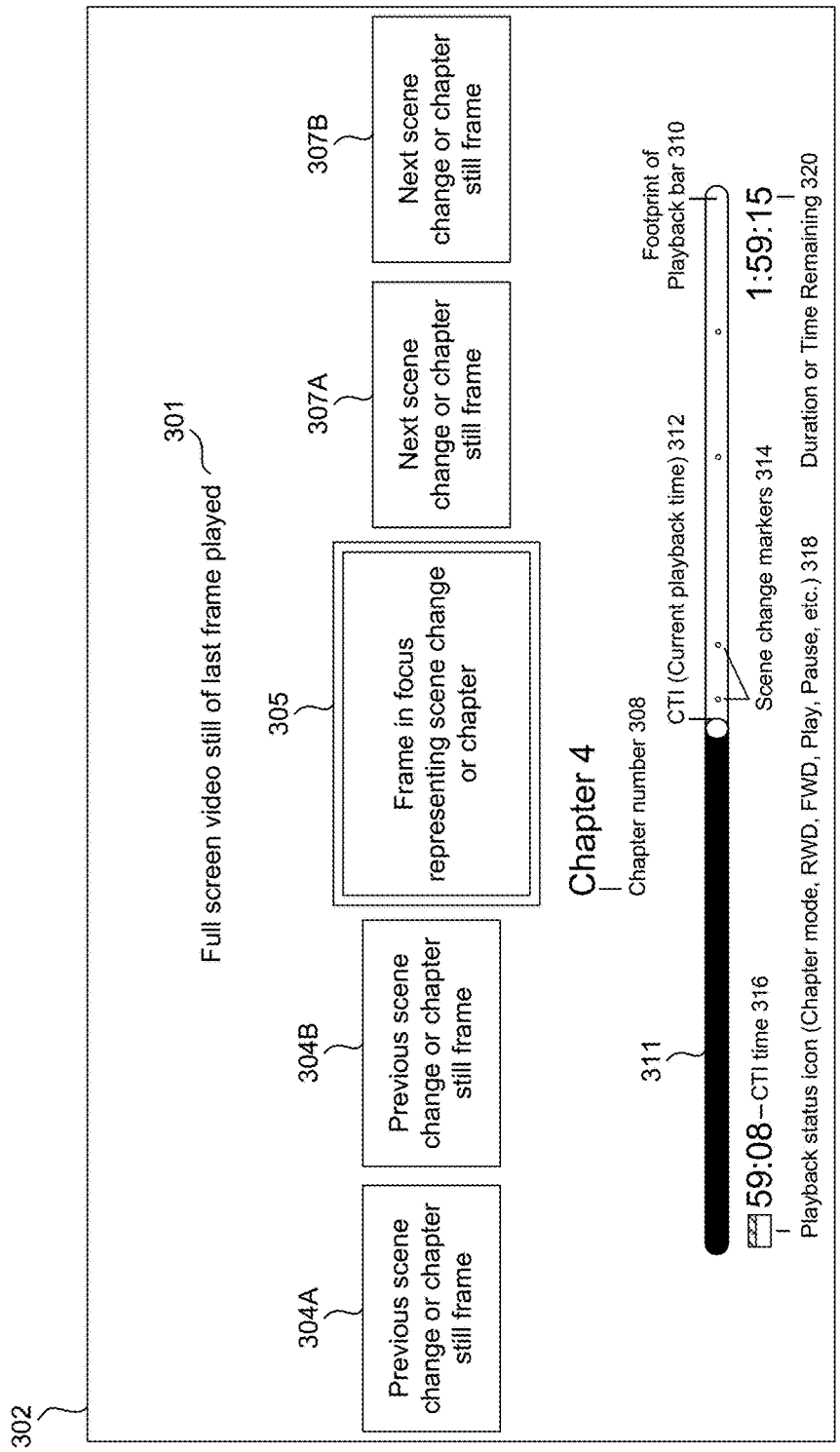
FIG. 3 illustrates an example graphical user interface for a television in a multimedia environment, according to some embodiments.

The GUI 302 may also include a playback bar 311 (element 310 represents the footprint of the playback bar 311). The playback bar 311 generally represents a timeline of the video being presented in the display device 106, and indicates the amount of the video that has been played. The right-most point of the playback bar 311 is the CTI (current playback time) 312, which in the timeline of the video corresponds to the video still 301 of the last frame played. The playback bar 311 includes scene change markers 314 that, when positioned to the right of the CTI 312 (as shown in the example of FIG. 3), correspond to the next scene change or chapter still frames 307.

The GUI 302 may include other elements representing the state of playback as feedback to the user 112. For example, the GUI 302 may indicate the CTI time 316 and the duration or time remaining 320. The GUI 302 may also include a playback status icon 318, indicating whether the video is currently in chapter mode, being rewound, fast forwarded, played, paused, stopped, etc.

Automatically and Programmatically Generating Scene Change Markers

In some embodiments, scene change markers 314 within the playback bar 311 are automatically and programmatically generated in a crowdsourced manner. Such embodiments leverage the fact that millions of people watch any given movie or TV show (or other content). These embodiments determine the level of interest of viewers through learning their interactions, so as to programmatically generate scene change markers.

By using this approach, it is possible to generate scene change markers for all the movies and TV shows (as well as other content) in an OTT provider's catalog. Also, this crowdsourced approach better ensures that the scene change markers capture the interests of viewers. While the following is described with reference to scene change markers, it should be understood that this disclosure is also applicable any other markers of interest to viewers.

Figure 4:
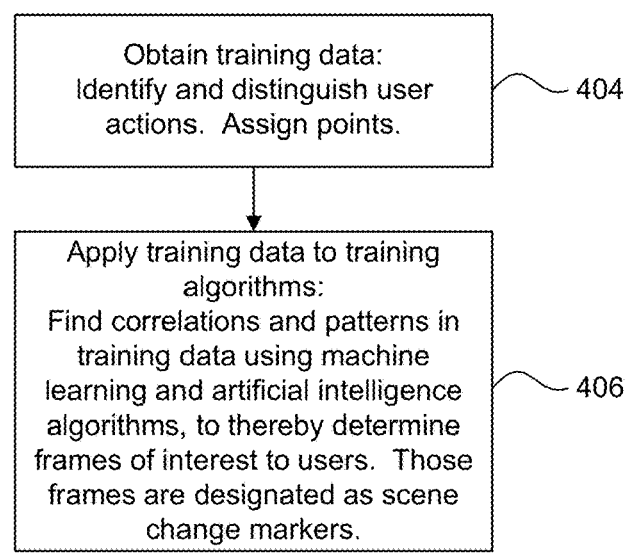
FIGS. 4 and 5 illustrate flowcharts for automatically and programmatically generating scene change markers, according to some embodiments.

FIG. 4 illustrates a method 402 for automatically and programmatically generating scene change markers in a crowdsourced manner, according to some embodiments. Method 402 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

Method 402 shall be described with reference to FIGS. 1 and 3. However, method 402 is not limited to those example embodiments.

In some embodiments, method 402 is directed to a learning system with two primary aspects: training data and a training algorithm. Accordingly, in step 404, training data is obtained. For example, as users 112 watch and interact with content, the media device 108 receives data on user interactions. The media device 108 identifies and distinguishes user interactions, and assigns point values to the types of interactions detected.

For example, an interaction (called "Interaction 1" for reference purposes) involving a user pausing the video for at least 10 seconds, and then resuming play without fast forwarding or rewinding, may have a point value of 1.

Another interaction (called "Interaction 2" for reference purposes) involving a user playing video for at least 10 minutes after fast forwarding or rewinding through the content a single time may have a point value of 2 points.

Still another interaction (called "Interaction 3" for reference purposes) involving a user playing video for at least 10 minutes after fast forwarding and rewinding through the content several times may have a point value of 4 points.

As shown by the above examples, in some embodiments, interactions are assigned point values based on the degree to which they reflect the user's intent to locate a particular location in the content (such as the beginning of a particular scene in a movie or TV show, for example). In the above examples, Interaction 3 is assigned a higher point value than Interaction 2, because fast forwarding/rewinding multiple times (per Interaction 3) indicates greater user intent to locate a particular location in the video, versus fast forwarding/rewinding a single time (per Interaction 2).

Similarly, pausing the video and then resuming play (per Interaction 1) may indicate some, but limited, user intent to locate a particular location in the content, so Interaction 1 is given a lower point value than either Interaction 2 or 3.

In some embodiments, each interaction has a landing frame, and the point value assigned to the interaction is associated with the landing frame. For example, for Interaction 1, the landing frame is the frame in the video where the user paused before resuming play. For Interactions 2 and 3, the landing frame is the frame where the fast forwarding/rewinding ended before the user resumed playing the video.

Another example interaction (called "Interaction 4" for reference purposes) may involve a user playing video for at least X minutes after fast forwarding and rewinding through the content several times. Similar to Interactions 2 and 3, the landing frame for Interaction 4 is the frame where the fast forwarding/rewinding ended before the user resumed playing the video. As will be appreciated, watching the video for 10 minutes versus 5 minutes (for example) may indicate greater user interest in the landing frame and thus merit a higher point value. Thus, the points for Interaction 4 may be a function of X, where the points increase as X increases.

In some embodiments, certain interactions may have negative points. An example interaction (called "Interaction 5" for reference purposes) may involve a user pausing the video for at least 10 seconds, and then fast forwarding or rewinding, rather than resuming play. The landing frame of Interaction 5 is the frame where the video is paused. Fast forwarding or rewinding from this frame, rather than playing, may indicate user disinterest in the landing frame. Accordingly, in some embodiments, the landing frame of Interaction 5 may be assigned a negative value, such as −1.

In some embodiments, step 404 is performed locally by media devices 108. Thus, millions of media devices 108 around the world may perform step 404 while their respective users watch a given movie or TV show (or other content), to detect user interactions associated with that movie/TV show.

These user interactions detected in step 404, and their associated point values, represent training data that is input to a training algorithm (represented by step 406, which is described below). In some embodiments, a minimum amount of training data is needed for the training algorithm to provide acceptable accuracy, typically N number of frames across M sessions. The values of N and M may be a function of the training algorithm used, and may depend on the desired accuracy of prediction. In some embodiments, the training algorithm is executed at the crowdsource server 114.

In step 406, the training algorithm makes use of the training data to find correlations and patterns in the data using machine learning and artificial intelligence (AI) algorithms. The algorithm reasons if there are many users who rewind or fast forward to play frame X, and thereafter continuously play the content, then frame X is of interest to a substantial number of users. Frame X may then be designated a crowdsourced scene change marker. Accordingly, the learning system with its training algorithm is configured to expose relevant patterns and correlations hidden in data, and reflect user behavior related to a single piece of content.

Figure 5:
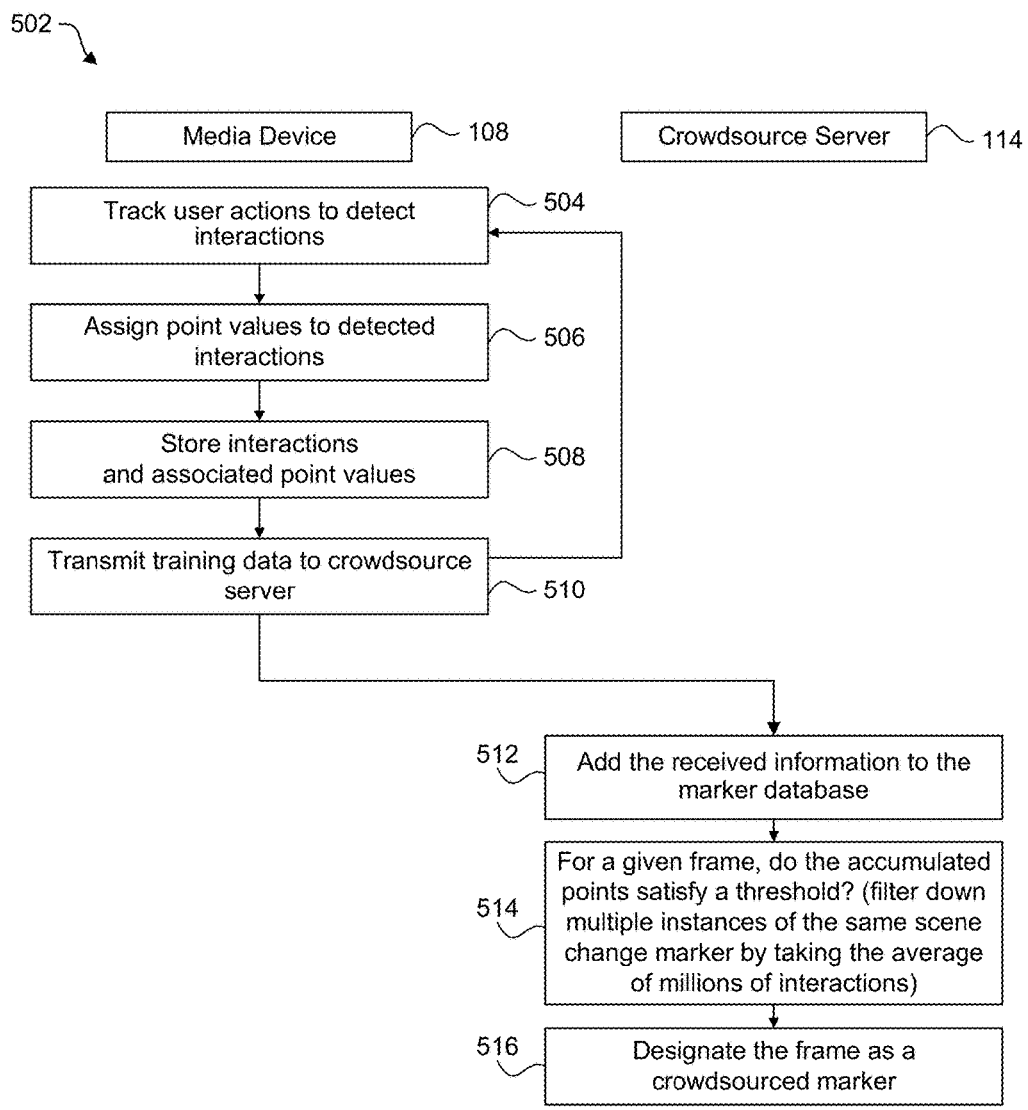

FIG. 5 illustrates a method 502 for automatically and programmatically generating scene change markers in a crowdsourced manner, according to some embodiments. Method 502 is an example implementation of method 402 in FIG. 4. However, method 402 is not limited to the example implementation of method 502.

Method 502 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art. Method 502 shall be described with reference to FIGS. 1-3. However, method 502 is not limited to those example embodiments.

In step 504, the media device 108 tracks actions of the user 112 to detect and distinguish user interactions. Examples of these user interactions are discussed above.

In step 506, the media device 108 assigns point values to the interactions detected in step 504. The point values may be fixed (such as with the example Interactions 1-3 and 5 discussed above) or variable (such as with the example Interaction 4).

In step 508, the detected interactions and assigned point values are stored in a database 208 of the media device 108. In some embodiments, the interactions and associated points are organized in the database 208 by content, and by the landing frames of the interactions. For example, interactions and point values that were obtained while viewing a particular movie are stored in records of the database 208 associated with that movie, and are ordered by the landing frames associated with those interactions.

In step 510, the media device 108 periodically transmits the detected interactions and assigned point values from the database 208 to the crowdsource server 114.

Steps 504-510 may be performed repeatedly by media device as users 112 view and navigate through content, as indicated by the control branch from step 510 to step 504. Also, millions of media devices 108 around the world may repeatedly perform steps 504-510 to detect user interactions and assign point values. This training data (that is, the detected interactions and point values) are provided to the crowdsource server 114 in step 510.

In step 512, the crowdsource server 114 stores the received interactions and associated point values in the marker database 118. In some embodiments, the interactions and associated points are organized in the marker database 118 by content, and by the landing frames of the interactions. For example, interactions and point values that were obtained while viewing a particular movie are stored in records of the marker database 118 associated with that movie, and are ordered by the landing frames associated with those interactions.

In step 514, for a given frame (called "Frame X" for reference purposes) of a movie or TV show (or other content), the crowdsource server 114 determines if the training data associated with Frame X constitutes a pattern such that Frame X should be designated as a scene change marker for the movie/TV show, using machine learning and artificial intelligence algorithms. For example, the crowdsource server 114 may add up the points of the interactions for which Frame X is the landing frame, and then determine if this accumulated point score meets or exceeds a predetermined threshold. If the accumulated point score meets or exceeds the predetermined threshold, then in step 516 the crowdsource server 114 designates Frame X as a crowdsourced scene change marker (also called a "crowdsourced marker" herein).

In some embodiments, to reduce noise and the number of crowdsourced markers, the crowdsource server 114 in step 514 takes into consideration a window having a plurality of frames when calculating the accumulated point score for Frame X. More specifically, in some embodiments, the crowdsource server 114 may average N amount of interactions related to the same scene change for a specific point in time within the movie or TV show to output a single frame that faithfully represents the scene change. The window (for example, the value of N) may be or represent a length of time that constitutes a typical scene change. Thus, the window may be 3 seconds, although this disclosure is not limited to that example. In some embodiments, the frame being considered—that is, Frame X in the above example—is positioned at the center of the window. Accordingly, in step 514, the crowdsource server 114 adds up the points of the interactions for which the frames in the window are the landing frames. Then, in step 516, the crowdsource server 114 designates Frame X as a crowdsourced marker if the accumulated point score for the window of frames meets or exceeds the predetermined threshold.

The crowdsource server 114 may repeat steps 514 and 516 for each frame of each movie or TV show (or other content) represented in the training data stored in the marker database 118. In this way, the crowdsource server 114 automatically and programmatically generates scene change markers in a crowdsourced manner, and such crowdsourced markers (shown as scene change markers 314 in the playback bar 311 of FIG. 3) enable quick and easy navigation through movies and TV shows (as well as other content).

Enhancements to the Video Playback Bar, Involving Snapping to Predesignated Time Markers The crowdsourced markers described above enable users to find the content they are interested in watching quickly. However, users also wish to navigate within the content they have selected without error.

Accordingly, in some embodiments, the playback bar 311 is a sticky playback bar that helps to avoid errors while users navigate through movies and other content. Based on the speed of the CTI 312 either during playback, fast forward, or rewind, when the user 112 hits the play/pause button 228, the CTI 312 will snap to the nearest time or scene change marker 314. However, the CTI 312 will not snap to the closest marker 314 when the closest marker 314 is far enough away from the CTI 312 to reasonably assume the user 112 did not intended to play/pause at that marker 314. Thus, whether the snap occurs depends on (1) the speed of the CTI 312 when the user 112 hits the play/pause button 228; and (2) the distance of the CTI 312 to the closest marker 308. These factors determine the stickiness of the playback bar 311 at any given time.

For example, if the CTI 312 is moving relatively slowly in playback bar 311 at the time of the pause/stop—i.e., such as at play speed—then the time/distance from the CTI 312 to the closest marker 308 must be relatively small for the snap to take place. On the other hand, if the CTI 312 is moving relatively fast in the playback bar 311 at the time of the pause/stop—i.e., at some level of fast forward—then the snap may occur even if the time/distance from the CTI 312 to the closest marker 308 is proportionally large.

In some embodiments, time thresholds are associated with CTI speeds in the playback bar 311. Example time thresholds are shown in Table 1. It should be understood, however, that this disclosure is not limited to the examples shown in Table 1.

TABLE 1

CTI Speed/Time Thresholds

| CTI Speed At Time of Pause/Stop | Time Threshold |
| --- | --- |
| Speed 1 | 750 milliseconds |
| Speed 2 | 1000 milliseconds |
| Speed 3 | 1500 milliseconds |

Speed 1 may correspond to normal play speed, and have a time threshold of 750 milliseconds. Thus, if the CTI 312 is moving at normal play speed (that is, at Speed 1) at the time of the pause/stop, then the snap will occur if the distance from the CTI 312 to the closest marker 308 is 750 milliseconds at normal play time of the video.

Speed 2 may correspond to normal fast forward or rewind speed, and have a time threshold of 1000 milliseconds. If the CTI 312 is moving at Speed 2 (via either fast forwarding or rewinding) at the time of the pause/stop, then the snap will occur if the distance from the CTI 312 to the closest marker 308 is 1000 milliseconds at normal play time of the video.

Speed 3 may correspond to fast forward or rewind times 2 speed, and have a time threshold of 1500 milliseconds. If the CTI 312 is moving at Speed 3 (via either fast forwarding or rewinding) at the time of the pause/stop, then the snap will occur if the distance from the CTI 312 to the closest marker 308 is 1500 milliseconds at normal play time of the video.

This disclosure is directed to any CTI speeds and time thresholds, not just those shown in the example of Table 1. In some embodiments, the time thresholds may be proportional to the speeds (at least when their values are initially set). Generally, to make the playback bar 311 more sticky, so that snaps occur more often, the time thresholds should be increased. To make the playback bar 311 less sticky, so that snaps occur less often, the time thresholds should be decreased.

Figure 6:
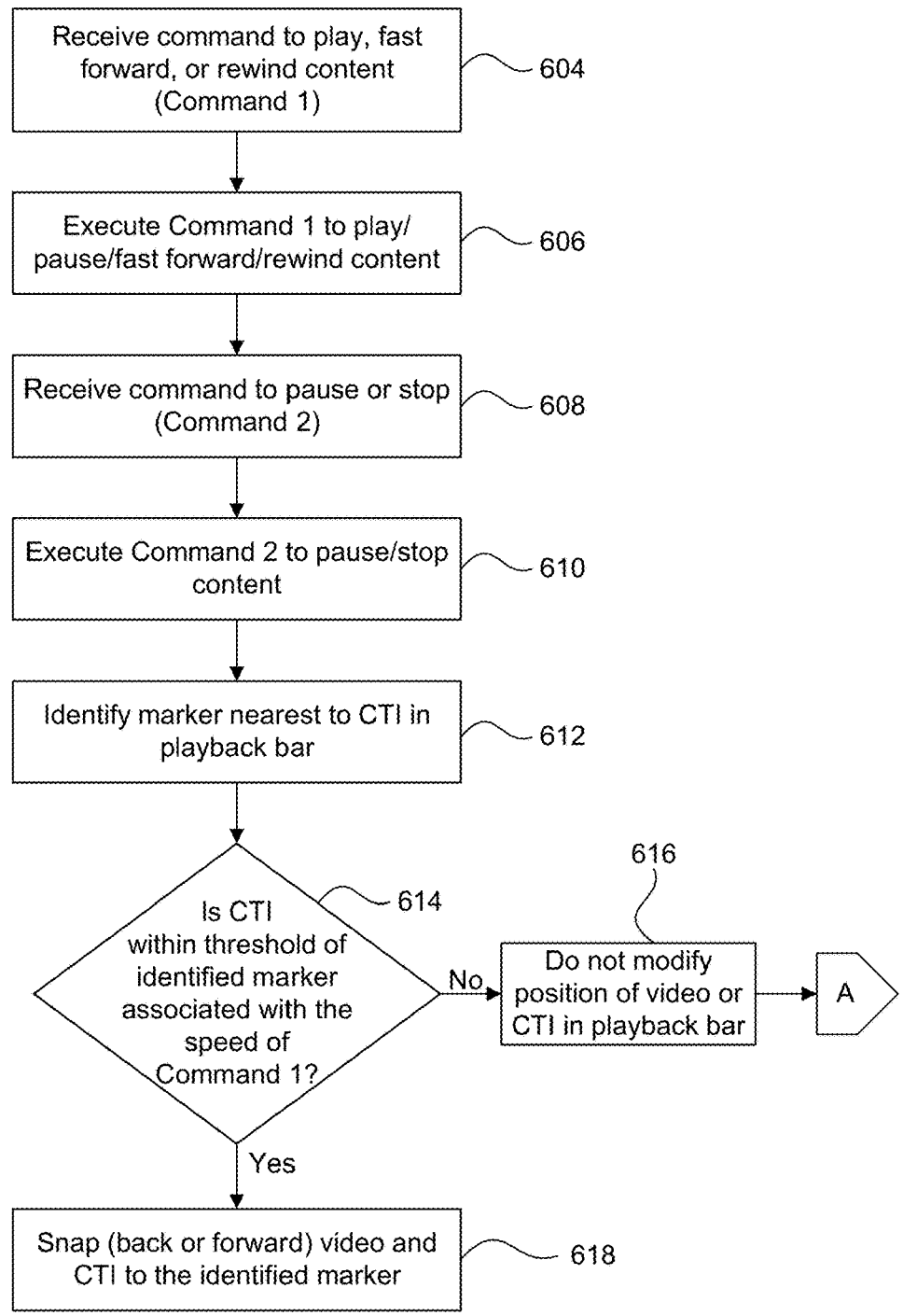
FIG. 6 illustrates a flowchart of the operation of an enhanced playback bar, according to some embodiments.

The functionality of the sticky playback bar 311 shall now be further described with reference to method 602 in FIG. 6. Method 602 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art. Method 602 shall be described with reference to FIGS. 1 and 3. However, method 602 is not limited to those example embodiments.

In step 604, media device 108 receives a command to play, pause, fast forward or rewind the movie (or other content) that is being presented in the display device 106. For reference purposes, this command is denoted as Command 1.

In step 606, the media device 108 executes Command 1, such that the movie is played, paused, fast forwarded, rewound, etc., in the display device 106. Also, the CTI 312 correspondingly advances in the playback bar 311.

In step 608, the media device 108 receives a command to pause or stop. For reference purposes, this command is denoted as Command 2.

In step 610, the media device 108 executes Command 2, such that the movie is paused/stopped in the display device 106. Also, the CTI 312 correspondingly pauses/stops in the playback bar 311.

In step 612, the media device 108 identifies the closest marker 314 to the CTI 312 in the playback bar 311. In some embodiments, the closest marker 314 can be before or after the CTI 312 in the playback bar 311. In other embodiments, based on system or user preferences for example, the closest marker 314 may only be prior to, or may only be after, the CTI 312 in the playback bar 311.

In step 614, the media device 108 determines if the normal play speed distance (measured in time) from the CTI 312 to the closest marker 314 is within a time threshold associated with the speed of the CTI 312 when Command 1 was being performed in step 606. Example time thresholds are shown in Table 1.

If the distance from the CTI 312 to the closest marker 314 is within the time threshold, then in step 618 the media device 108 modifies (i.e., snaps) the CTI 312 to the closest marker 314, and also modifies the movie in the display device 106 to the point in the video corresponding to the new position of the CTI 312 in the playback bar 311.

In contrast, if the distance is not within the time threshold, then in step 616 the media device 108 does not modify the position of the CTI 312 in the playback bar 311, and correspondingly does not modify the position of the movie that is being displayed in the display device 106. In other words, if the distance is not within the time threshold, then the media device 108 does not automatically snap back to the closest marker 314.

In the manner described above, a sticky playback bar 311 has been achieved.

Referring back to step 616, it is possible that the media device 108's decision not to snap back was incorrect. Accordingly, in some embodiments, the media device 108 will monitor the user's actions following step 616, to determine if the user manually moves the CTI 312 to a position close to the closest marker 314. This is referred to herein as a "manual snap back." If a significant number of users manually snap back under similar circumstances, then a decision may be made to adjust the stickiness level of the playback bar 311. Referring back to Table 1, for example, if a significant number of users manually snap back when the CTI 312 is moving at Speed 1, then a decision may be made to increase the associated time threshold from 1 second to 1.5 seconds (or some other value greater than 1 second). In this manner, adjustment of the stickiness level of the playback bar 311 in a crowdsourced manner is achieved.

Figure 7:
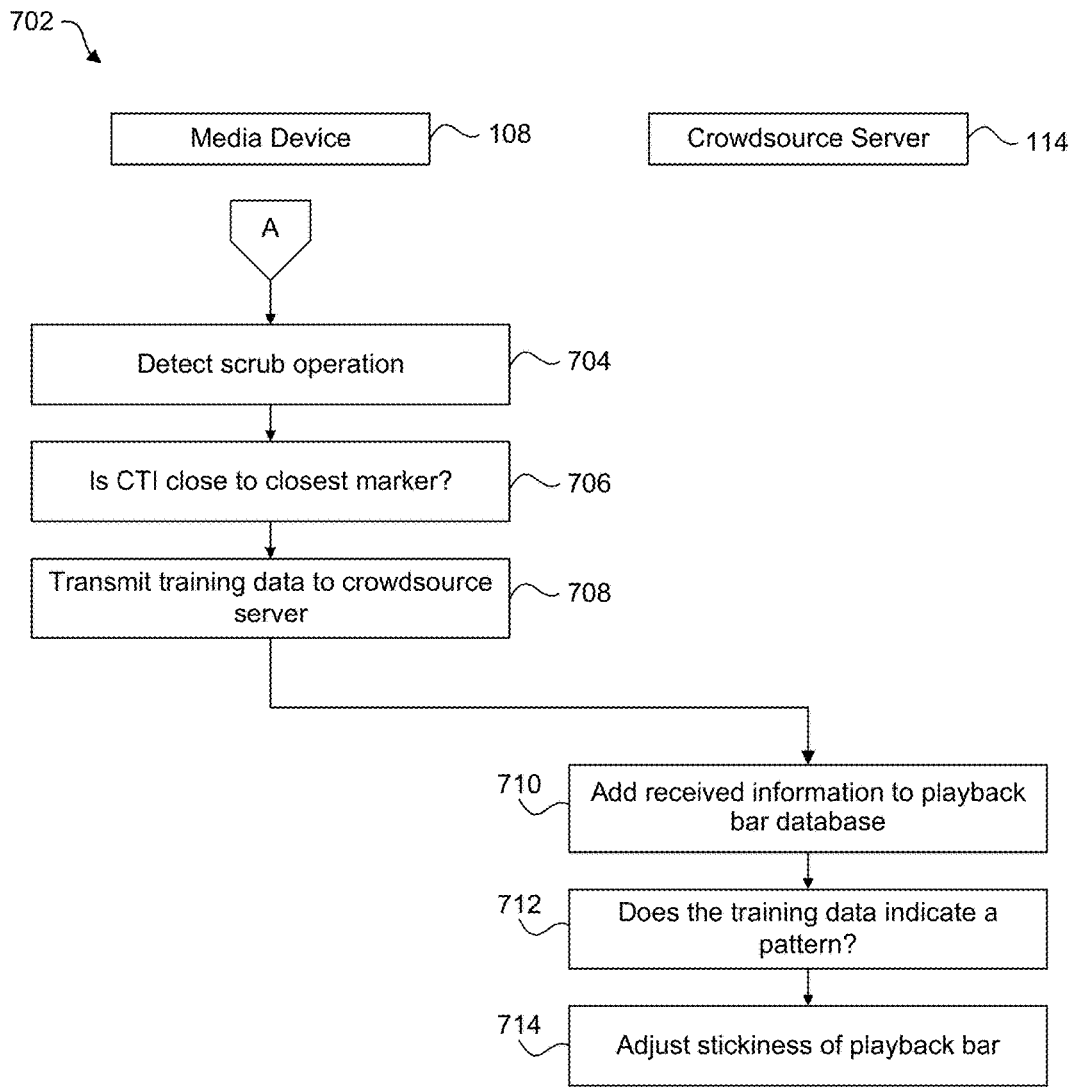
FIG. 7 illustrates a flowchart for adjusting the stickiness of a playback bar in a crowdsourced manner, according to some embodiments.

An example of such functionality is represented by flowchart 702 of FIG. 7. Flowchart 702 continues from step 616 in FIG. 6, where the position of the CTI 312 was not modified in the playback bar 311 because the normal play speed distance (measured in time) from the CTI 312 to the closest marker 314 was not within a time threshold associated with the speed of the CTI 312 when Command 1 was performed in step 606. Flowchart 702 operates to modify that time threshold (when appropriate) in a crowdsourced manner.

Accordingly, in step 704, the media device 108 detects a scrub operation performed by the user 112 after the pause/stop command of step 608.

In step 706, the media device 108 determines if the CTI 312 after performance of the scrub operation (in step 704) is close to the closest marker 314 identified in step 612. The CTI 312 may be determined to be close to the closest marker 314 if it is within a predetermined threshold (measured either in frames or normal play time, for example).

If the CTI 312 is determined to be close to the closest marker 314, then that indicates that the user effectively performed a manual snap back of the CTI 312 to the closest marker 314. Thus, it would have enhanced the user's viewing experience if the media device 108 had automatically performed the snap per step 618, rather than not performing the snap per step 616. Accordingly, this information, which is considered training data, is transmitted to the crowdsource server 114 in step 708.

Steps 704-708 may be performed repeatedly by media device 108 as users 112 view and navigate through content. Also, millions of media devices 108 around the world may repeatedly perform steps 704-708 in a similar manner. This training data is provided to the crowdsource server 114 in step 708.

In step 710, the crowdsource server 114 stores the received training information in the playback bar database 119.

In step 712, the crowdsource server 114 determines if the received training data indicates a pattern regarding the time thresholds associated with CTI Speeds (see Table 1). For example, the training data may indicate that a large number of users manually perform snap backs when (a) the CTI speed is Speed 1, and (b) the distance from the CTI 312 to the closest marker 314 is 1.5 seconds. Accordingly, in step 714, the crowdsource server 114 may change the time threshold associated with Speed 1 from 1 second to 1.5 seconds. In this way, the media devices 108 and the crowdsource server 114 operate to change the stickiness of the playback bar 311 in a crowdsourced manner.

Figure 8:
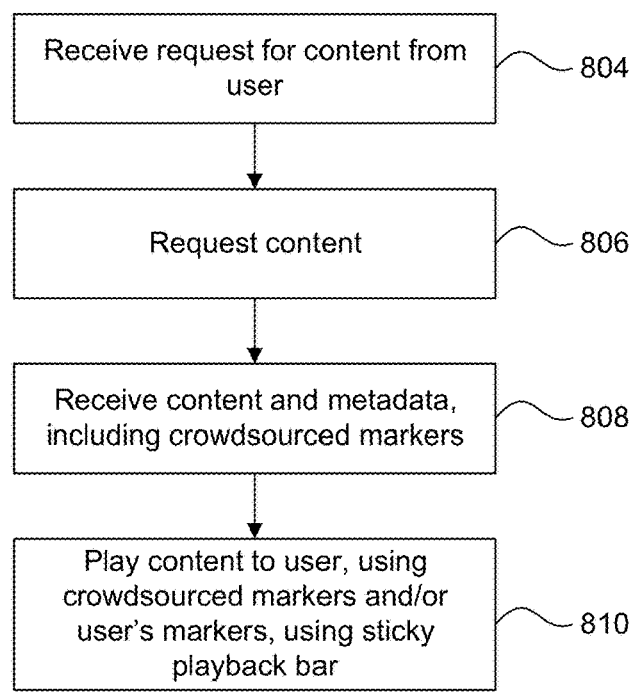
FIG. 8 illustrates a flowchart of a method for presenting content (such as a movie or TV show) to a user using an enhanced playback bar, wherein the content includes crowdsourced markers, according to some embodiments.

FIG. 8 illustrates a method 802 for providing a movie (or other content) to a user 112, wherein the movie includes crowdsourced markers, according to some embodiments.

In step 804, media device 108 receives a request for a movie from user 112.

In step 806, media device 108 requests the movie from the content server 122.

In step 808, media device 108 receives the movie from the content server 122. Media device 108 also receives metadata 126 corresponding to the movie. The metadata 126 may include crowdsourced markers generated as described herein. As part of step 808 or at some other time, the media device 108 may also receive the information of Table 1 from the content server 122 or the crowdsource server 114.

In step 810, media device 108 plays the movie to the user 112 on display device 106. As described above, the user 112 may navigate through the movie using GUI 302. GUI 302 includes the playback bar 311. The playback bar 311 includes scene change markers 314, some or all of which may be crowdsourced markers.

While playing the movie to the user 112 in step 810, the playback bar 311 may be sticky, as described above. As also described above, the extent to which the playback bar 311 is sticky may be adjusted in a crowdsourced manner.

Example Computer System

Figure 9:
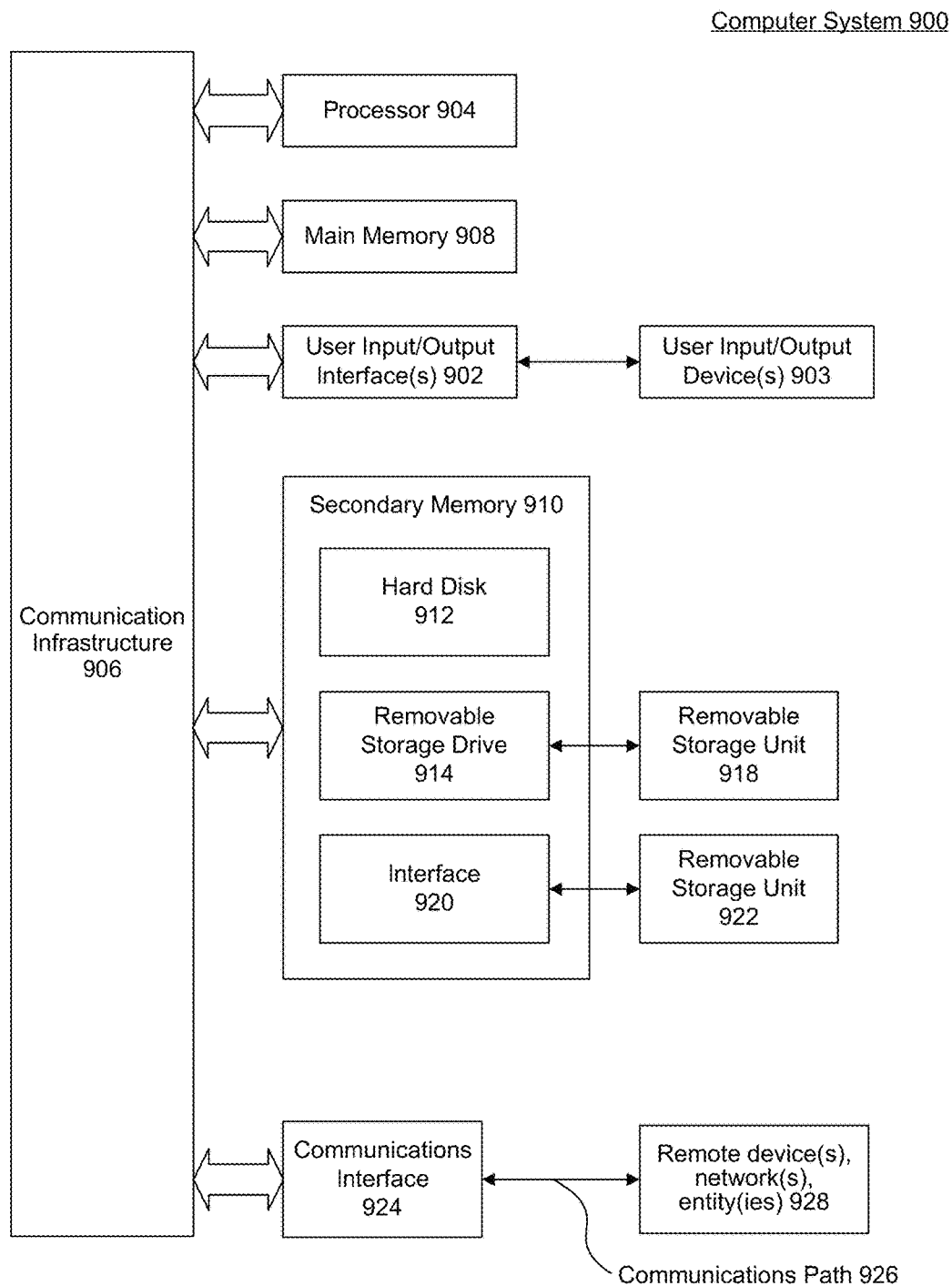
FIG. 9 illustrates an example computer system useful for implementing various embodiments.

Various embodiments and/or components therein can be implemented, for example, using one or more computer systems, such as computer system 900 shown in FIG. 9. Computer system 900 can be any computer or computing device capable of performing the functions described herein. For example, one or more computer systems 900 can be used to implement any embodiments described herein, and/or any combination or sub-combination thereof.

Computer system 900 includes one or more processors (also called central processing units, or CPUs), such as a processor 904. Processor 904 is connected to a communication infrastructure or bus 906.

One or more processors 904 can each be a graphics processing unit (GPU). In some embodiments, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 900 also includes user input/output device(s) 903, such as monitors, keyboards, pointing devices, etc., that communicate with communication infrastructure 906 through user input/output interface(s) 902.

Computer system 900 also includes a main or primary memory 908, such as random access memory (RAM). Main memory 908 can include one or more levels of cache. Main memory 908 has stored therein control logic (i.e., computer software) and/or data.

Computer system 900 can also include one or more secondary storage devices or memory 910. Secondary memory 910 can include, for example, a hard disk drive 912 and/or a removable storage device or drive 914. Removable storage drive 914 can be a floppy disk drive, a magnetic tape drive, a compact disk drive, an optical storage device, tape backup device, and/or any other storage device/drive.

Removable storage drive 914 can interact with a removable storage unit 918. Removable storage unit 918 includes a computer usable or readable storage device having stored thereon computer software (control logic) and/or data. Removable storage unit 918 can be a floppy disk, magnetic tape, compact disk, DVD, optical storage disk, and/any other computer data storage device. Removable storage drive 914 reads from and/or writes to removable storage unit 918 in a well-known manner.

According to an exemplary embodiment, secondary memory 910 can include other means, instrumentalities or other approaches for allowing computer programs and/or other instructions and/or data to be accessed by computer system 900. Such means, instrumentalities or other approaches can include, for example, a removable storage unit 922 and an interface 920. Examples of the removable storage unit 922 and the interface 920 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 can further include a communication or network interface 924. Communication interface 924 enables computer system 900 to communicate and interact with any combination of remote devices, remote networks, remote entities, etc. (individually and collectively referenced by reference number 928). For example, communication interface 924 can allow computer system 900 to communicate with remote devices 928 over communications path 926, which can be wired and/or wireless, and which can include any combination of LANs, WANs, the Internet, etc. Control logic and/or data can be transmitted to and from computer system 900 via communication path 926.

In some embodiments, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 900, main memory 908, secondary memory 910, and removable storage units 918 and 922, as well as tangible, non-transitory articles of manufacture embodying any combination of the foregoing. Such control logic, when executed by one or more data processing devices (such as computer system 900), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 9. In particular, embodiments can operate with software, hardware, and/or operating system implementations other than those described herein.

CONCLUSION

It is to be appreciated that the Detailed Description section, and not the Summary and Abstract sections, is intended to be used to interpret the claims. The Summary and Abstract sections can set forth one or more but not all exemplary embodiments as contemplated by the inventors, and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A media system, comprising:
a display device comprising a graphical user interface (GUI) having a sticky playback bar, wherein the sticky playback bar includes a current playback time (CTI) and a plurality of scene change markers, wherein a stickiness of the playback bar is based on at least a speed of the CTI in the sticky playback bar, and a distance of the CTI to a closest scene change marker in the sticky playback bar, at a time a pause or stop command is received by a media device; and
the media device configured to:
receive an end command subsequent to a skip command that skips through a portion of content for display on the display device, wherein the end command stops an execution of the skip command;
determine a speed of the CTI corresponding to the skip command;
determine a threshold distance to a closest scene change marker of the plurality of scene change markers, wherein the threshold distance increases as the speed of the CTI corresponding to the skip command increases; and
determine whether a position within the portion of content corresponding to the end command is within the threshold distance,
wherein upon a determination that the position is within the threshold distance, playing the content from the closest scene change marker of the plurality of scene change markers, and
wherein upon a determination that the position is beyond the threshold distance, playing the content from the position.

2. The media system of claim 1, wherein the media device is further configured to:
receive a first command to play, fast forward, rewind, seek, or scrub through content being played on the display device, wherein the first command corresponds to the skip command;
execute the first command;
receive a second command to pause or stop, wherein the second command corresponds to the end command;
execute the second command;
identify a scene change marker in the playback bar closest to the CTI after execution of the second command;
determine that a distance from the CTI to the closest scene change marker of the plurality of scene change markers is within a time threshold; and
snap the CTI to the closest scene change marker of the plurality of scene change markers, wherein the snap includes skipping one or more scenes between the execution of the second command and the closest scene change marker of the plurality of scene change markers.

3. The media system of claim 2, wherein the time threshold is associated with a speed of the CTI during the execution of the first command and just before the execution of the second command.

4. The media system of claim 2, wherein the time threshold is adjusted in a crowdsourced manner.

5. The media system of claim 1, wherein the media device is further configured to identify a scene change marker that is prior to the CTI in the sticky playback bar.

6. The media system of claim 1, wherein the closest scene change marker is determined in a crowdsourced manner.

7. A method in a media device, comprising:
causing a display device to display a graphical user interface (GUI) having a playback bar, wherein the playback bar includes a current playback time (CTI) and a plurality of scene change markers;
causing the playback bar to be sticky, wherein stickiness of the playback bar is based on at least a speed of the CTI in the playback bar, and a distance of the CTI to a closest scene change marker in the playback bar, at a time a pause or stop command is received by the media device;
receiving an end command subsequent to a skip command that skips through a portion of content for display on the display device, wherein the end command stops an execution of the skip command;
determining the speed of the CTI corresponding to the skip command;
determining a threshold distance to the closest scene change marker of the plurality of scene change markers, wherein the threshold distance increases as the speed of the CTI corresponding to the skip command increases; and
determining whether a position within the content corresponding to the end command is within the threshold distance,
wherein upon a determination that the position is within the threshold distance, playing the content from the closest scene change marker of the plurality of scene change markers, and
wherein upon a determination that the position is beyond the threshold distance, playing the content from the position.

8. The method of claim 7, wherein the causing the playback bar to be sticky comprises:
receiving a first command to play, fast forward, rewind, seek, or scrub through content being played on the display device, wherein the first command corresponds to the skip command;
executing the first command;
receiving a second command to pause or stop, wherein the second command corresponds to the end command;
executing the second command;
identifying a scene change marker in the playback bar closest to the CTI after execution of the second command;
determining that a distance from the CTI to the closest scene change marker of the plurality of scene change markers is within a time threshold; and
snapping the CTI to the closest scene change marker of the plurality of scene change markers, wherein the snapping comprises skipping one or more scenes between the execution of the second command and the closest scene change marker of the plurality of scene change markers.

9. The method of claim 8, wherein the time threshold is associated with the speed of the CTI during execution of the first command and just before execution of the second command.

10. The method of claim 8, wherein the time threshold is adjusted in a crowdsourced manner.

11. The method of claim 7, further comprising:
identifying a scene change marker that is prior to the CTI in the playback bar.

12. A non-transitory computer-readable module having instructions stored thereon that, when executed by at least one computing device, cause the at least one computing device to perform operations comprising:
causing a display device to display a graphical user interface (GUI) having a playback bar, wherein the playback bar includes a current playback time (CTI) and a plurality of scene change markers; and
causing the playback bar to be sticky, wherein stickiness of the playback bar is based on at least (1) a speed of the CTI in the playback bar, and (2) a distance of the CTI to a closest scene change marker in the playback bar, at a time a pause or stop command is received by a media device;
receiving an end command subsequent to a skip command that skips through a portion of content for display on the display device, wherein the end command stops an execution of the skip command;
determining the speed of the CTI corresponding to the skip command;
determining a threshold distance to the closest scene change marker of the plurality of scene change markers, wherein the threshold distance increases as the speed of the CTI corresponding to the skip command increases; and
determining whether a position within the portion of content corresponding to the end command is within the threshold distance,
wherein upon a determination that the position is within the threshold distance, playing the content from the closest scene change marker of the plurality of scene change markers, and
wherein upon a determination that the position is beyond the threshold distance, playing the content from the position.

13. The non-transitory computer-readable module of claim 12, wherein the causing the playback bar to be sticky comprises:
receiving a first command to play, fast forward, rewind, seek, or scrub through content being played on the display device, wherein the first command corresponds to the skip command;
executing the first command;
receiving a second command to pause or stop, wherein the second command corresponds to the end command;
executing the second command;
identifying a scene change marker in the playback bar closest to the CTI after execution of the second command;
determining that a distance from the CTI to the closest scene change marker of the plurality of scene change markers is within a time threshold; and
snapping the CTI to the closest scene change marker of the plurality of scene change markers, wherein the snapping comprises skipping one or more scenes between the execution of the second command and the closest scene change marker of the plurality of scene change markers.

14. The non-transitory computer-readable module of claim 13, wherein the time threshold is associated with the speed of the CTI during execution of the first command and just before execution of the second command.

15. The non-transitory computer-readable module of claim 13, wherein the time threshold is adjusted in a crowdsourced manner.

16. The non-transitory computer-readable module of claim 12, the operations further comprising:
   identifying a scene change marker that is prior to the CTI in the playback bar.

17. A method for adjusting a stickiness of a playback bar in a crowdsourced manner, comprising:
   receiving a first command to play, fast forward, rewind, seek, or scrub through content being played on a display device, wherein the display device displays a graphical user interface (GUI) having the playback bar, wherein the playback bar includes a current playback time (CTI) and a plurality of scene change markers, wherein the playback bar is sticky;
   executing the first command;
   receiving a second command to pause or stop;
   executing the second command;
   identifying a scene change marker in the playback bar closest to the CTI after execution of the second command;
   determining that a distance from the CTI to a closest scene change marker is not within a time threshold wherein the time threshold increases as a speed of the CTI corresponding to the first command increases;
   detecting a manual snap of the CTI to a location in the playback bar close to the closest scene change marker, wherein the detecting represents training data; and
   providing the training data to a crowdsource server, wherein the crowdsource server determines correlations and patterns in the training data to adjust the stickiness of the playback bar in a crowdsourced manner.

* * * * *

UNITED STATES PATENT AND TRADEMARK OFFICE
CERTIFICATE OF CORRECTION

| | | |
|---|---|---|
| PATENT NO. | : 10,334,326 B2 | Page 1 of 1 |
| APPLICATION NO. | : 15/806379 | |
| DATED | : June 25, 2019 | |
| INVENTOR(S) | : Tegethoff et al. | |

It is certified that error appears in the above-identified patent and that said Letters Patent is hereby corrected as shown below:

In the Claims

Claim 12, Column 16, Line 12, "wherein stickiness" should read --wherein a stickiness--.

Signed and Sealed this
Twenty-first Day of April, 2020

Andrei Iancu
*Director of the United States Patent and Trademark Office*